(12) United States Patent
Chen et al.

(10) Patent No.: US 7,891,947 B2
(45) Date of Patent: Feb. 22, 2011

(54) TURBINE BLADE AND METHOD OF FABRICATING THE SAME

(75) Inventors: Xianglei Chen, Clifton Park, NY (US);
Peggy Lynn Baehmann, Glenville, NY (US); Wendy Wen-Ling Lin, Niskayuna, NY (US); Youdong Zhou, Niskayuna, NY (US); Shu Ching Quek, Clifton Park, NY (US); Grama Narasimhaprasad Praveen, Clifton Park, NY (US); Bowden Kirkpatrick, Bennington, VT (US); Robert Michael Zirin, Niskayuna, NY (US); Gang Qian, Leland, NC (US)

(73) Assignee: General Electric Company, Niskayuna, NY (US)

( * ) Notice: Subject to any disclaimer, the term of this patent is extended or adjusted under 35 U.S.C. 154(b) by 152 days.

(21) Appl. No.: 12/333,522

(22) Filed: Dec. 12, 2008

(65) Prior Publication Data

US 2010/0143148 A1    Jun. 10, 2010

(51) Int. Cl.
*B64C 11/20* (2006.01)
(52) U.S. Cl. .................................................. 416/225
(58) Field of Classification Search ................. 416/225, 416/232, 233, 226
See application file for complete search history.

(56) References Cited

U.S. PATENT DOCUMENTS

| | | | |
|---|---|---|---|
| 4,389,162 A | 6/1983 | Doellinger et al. | |
| 4,474,536 A | 10/1984 | Gougeon et al. | |
| 4,643,646 A * | 2/1987 | Hahn et al. | 416/226 |
| 4,976,587 A | 12/1990 | Johnston et al. | |
| 7,179,059 B2 | 2/2007 | Sorensen et al. | |
| 7,186,086 B2 | 3/2007 | Yoshida | |
| 2007/0025856 A1 | 2/2007 | Moroz | |
| 2007/0253824 A1 | 11/2007 | Eyb | |
| 2007/0258823 A1 | 11/2007 | Haarh et al. | |
| 2008/0069699 A1 | 3/2008 | Bech | |

FOREIGN PATENT DOCUMENTS

| | | |
|---|---|---|
| EP | 1561947 A2 | 8/2005 |
| EP | 1584817 A1 | 10/2005 |
| GB | 2416195 A | 1/2006 |
| JP | 2006123277 A  * | 5/2006 |
| JP | 2006329109 A  * | 12/2006 |
| JP | 2008180102 A  * | 8/2008 |
| WO | 2006002621 A1 | 1/2006 |

* cited by examiner

*Primary Examiner*—Richard Edgar
(74) *Attorney, Agent, or Firm*—Ann M. Agosti

(57) ABSTRACT

A turbine blade includes at least two blade segments. Each blade segment includes first and second shells joined together, a base region, at least one joint region including a mating face. Each of the first and second shells includes an outer skin, a base spar cap attached to an inner surface of the outer skin in the base region, a joint spar cap attached to the inner surface of the outer skin in the joint region and adjacent to at least a portion of the base spar cap. The joint spar cap includes holes in the mating face of the joint region. The turbine blade further includes fasteners within the holes for securing the at least two blade segments together.

19 Claims, 5 Drawing Sheets

TURBINE BLADE AND METHOD OF FABRICATING THE SAME

BACKGROUND

The invention relates generally to turbine blades, and, more particularly, to multiple-piece turbine blades and methods of fabricating the turbine blades.

Turbine blades such as those used for wind turbines usually have large sizes. Shipment of a large blade from where it was made to where it will be assembled is inconvenient and costly.

There is a need in the art to ship the turbine blades in segments and then join the segments together at a remote assembly location. However, conventional methods for addressing this need often result in undesirable levels of complexity and expense. Accordingly, an improved joint system and a corresponding method are needed to address one or more of the foregoing issues.

BRIEF DESCRIPTION

In accordance with an embodiment disclosed herein, a turbine blade is provided. The turbine blade includes at least two blade segments. Each blade segment includes first and second shells joined together, a base region, at least one joint region including a mating face. Each of the first and second shells includes an outer skin, a base spar cap attached to an inner surface of the outer skin in the base region, a joint spar cap attached to the inner surface of the outer skin in the joint region and adjacent to at least a portion of the base spar cap. The joint spar cap includes holes in the mating face of the joint region. The turbine blade further includes fasteners within the holes for securing the at least two blade segments together.

In accordance with another embodiment disclosed herein, a blade segment is provided. The blade segment includes first and second shells joined together, a base region, and at least one joint region including a mating face. Each of the first and second shells further includes an outer skin, a base spar cap attached to an inner surface of the outer skin in the base region, and a joint spar cap attached to the inner surface of the outer skin in the joint region and respectively adjacent to at least a portion of a corresponding base spar cap. The joint spar cap includes holes in the mating face of the joint region for insertion of fasteners.

In accordance with still another embodiment disclosed herein, a method of fabricating a blade segment is provided. The method includes providing first and second outer skins of the first and second shells; providing joint spar caps respectively on inner surfaces of the first and second outer skins in joint regions of the first and second outer skins; positioning base spar caps respectively on each inner surface of the first and second outer skins in base regions of the first and second outer skins and adjacent to the joint spar caps; positioning at least one shear web between the pair of base spar caps and between the pair of joint spar caps; attaching the first and second shells; and providing holes in the joint spar caps in mating faces of the joint regions for insertion of fasteners.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
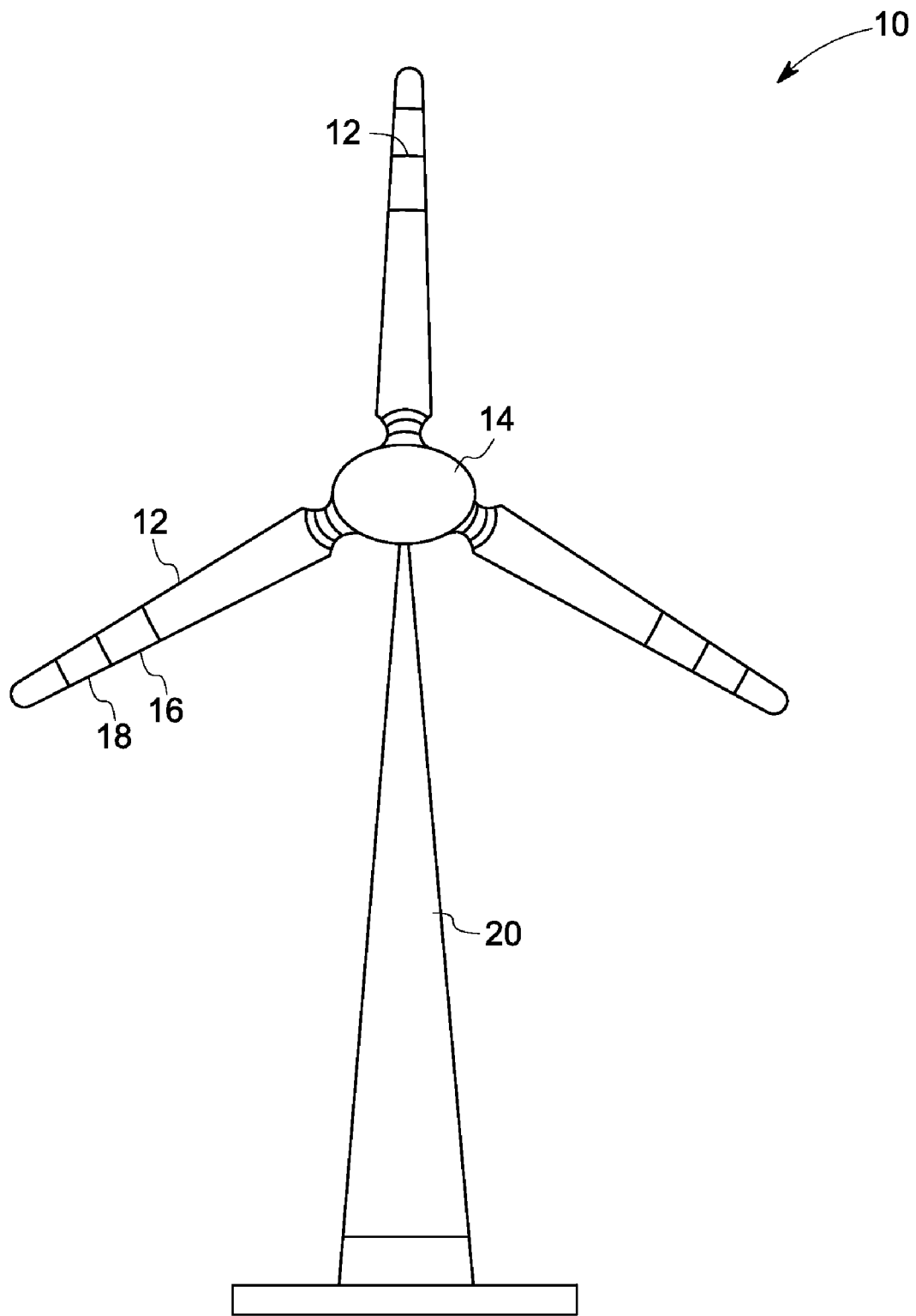
FIG. 1 is a schematic illustration of a wind turbine including several blades.

As discussed in detail below, embodiments of the present invention include turbine blades and methods for fabricating turbine blades. As used herein, the term "turbine blades" refers to blades used in various applications such as, but not limited to, wind turbines and aircraft systems.

As used herein, singular forms such as "a," "an," and "the" include plural referents unless the context clearly dictates otherwise. For example, although a two-segment blade is shown in the drawings for purposes of illustration, more segments may be included if desired.

FIGS. 1-7 show embodiments of the invention used in a wind turbine system 10. Referring to FIG. 1, wind turbine system 10 includes a rotor 14 and several blades 12. Each blade 12 includes at least first and second blade segments 16 and 18. As used herein after, the term "outboard" means farther from rotor 14, and "inboard" means closer to rotor 14. Thus, in the exemplary embodiment, first blade segment 16 is an inboard blade segment, and second blade segment 18 is an outboard blade segment. The blades 12 are mounted atop a tower 20.

Figure 2:
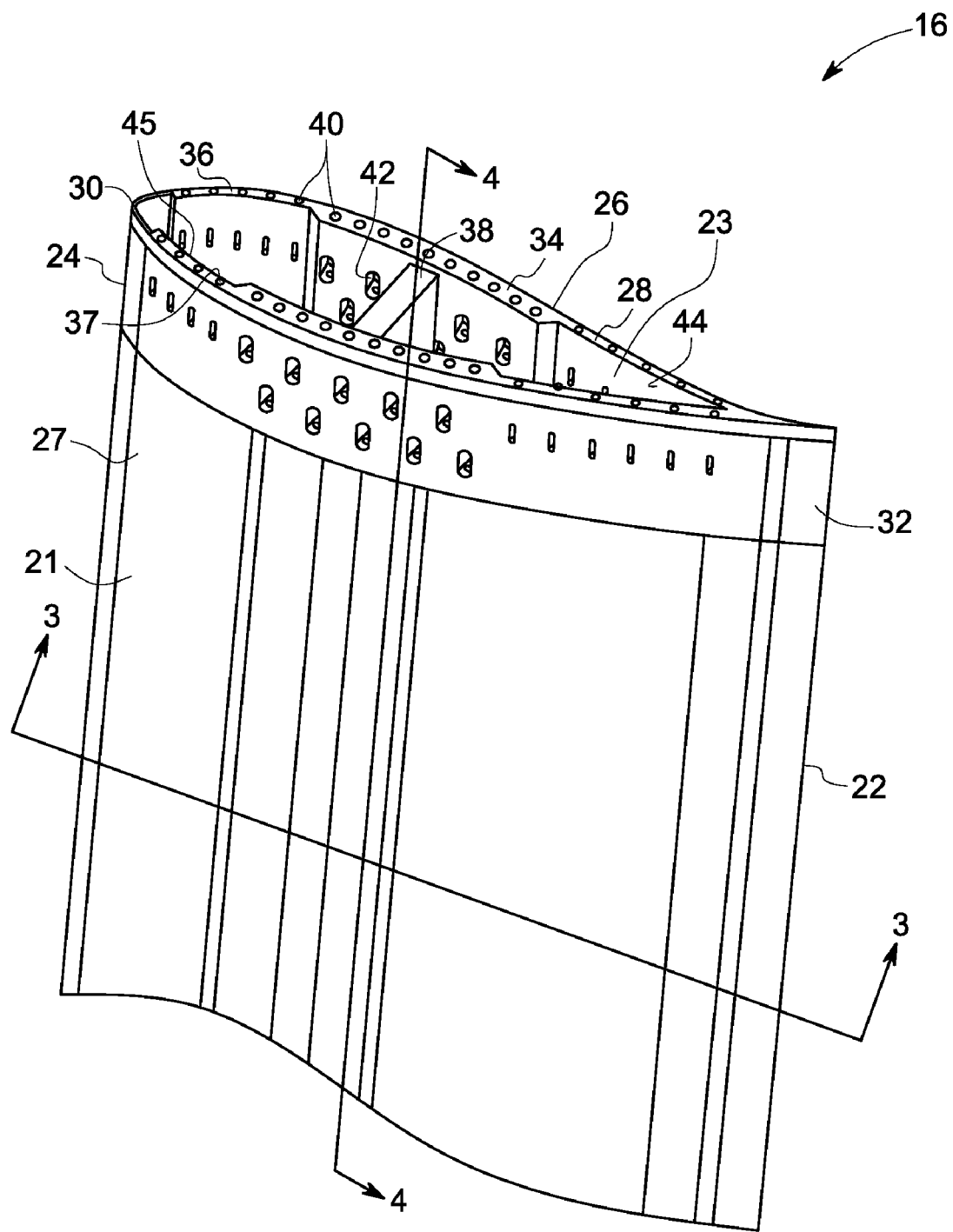
FIG. 2 is a perspective view of an inboard blade segment according to an embodiment of the invention.

FIG. 2 is an exemplary perspective view of inboard blade segment 16, which includes a base region 22, a joint region 24, a pressure side shell 23, and a suction side shell 21. Each shell includes an outer skin 26, 27, a core 36, 37, an inner skin 44, 45, and spar caps which are shown in more detail below with respect to FIG. 4. Joint region 24 includes a mating face 28 for engaging with outboard blade segment 18. Joint region 24 is formed in a shape of an airfoil section and has a leading edge 30 and a training edge 32. In certain embodiments, outer skin 26 and 27 is made from glass reinforced composites such as, for example biaxial glass, uniaxial glass, or triaxial glass, or any combination of thereof. In certain embodiments, cores 36 and 37 comprise wood, for example, balsa, or foam, or a combination of both. In certain embodiments, inner skin 44, 45 is formed from glass reinforced composites such as, for example, biaxial glass layers.

In one embodiment, joint region 24 has a stepped inner surface, and includes joint spar caps 34 which have larger thicknesses than cores 36 and 37. In one example, joint spar cap 34 of joint region 24 comprises triaxial glass layers.

One or more longitudinal crossbeams 38, also referred to as shear webs, are disposed within joint region 24 and between upper and lower joint spar caps 34. Shear web 38 is adapted to withstand aerodynamic shear loading on blade 12. In certain embodiments, shear web 38 is made from foam strengthened with biaxial glass.

A plurality of longitudinal holes 40 extend into mating face 28 in the longitudinal direction. In the exemplary embodiment, holes 40 in joint spar caps 34 have a larger diameter than holes 40 in cores 36 and 37. Joint region 24 may additionally define a plurality of access slots 42 along an outer and/or inner periphery thereof. Each access slot 42 extends at least partially through joint region 24 and communicates with a corresponding hole 40. In the exemplary embodiment, two rows of access slots 42 are respectively defined in upper and lower joint spar caps 34, and the two rows of access slots 42 are staggered in the longitudinal direction.

Figure 3:
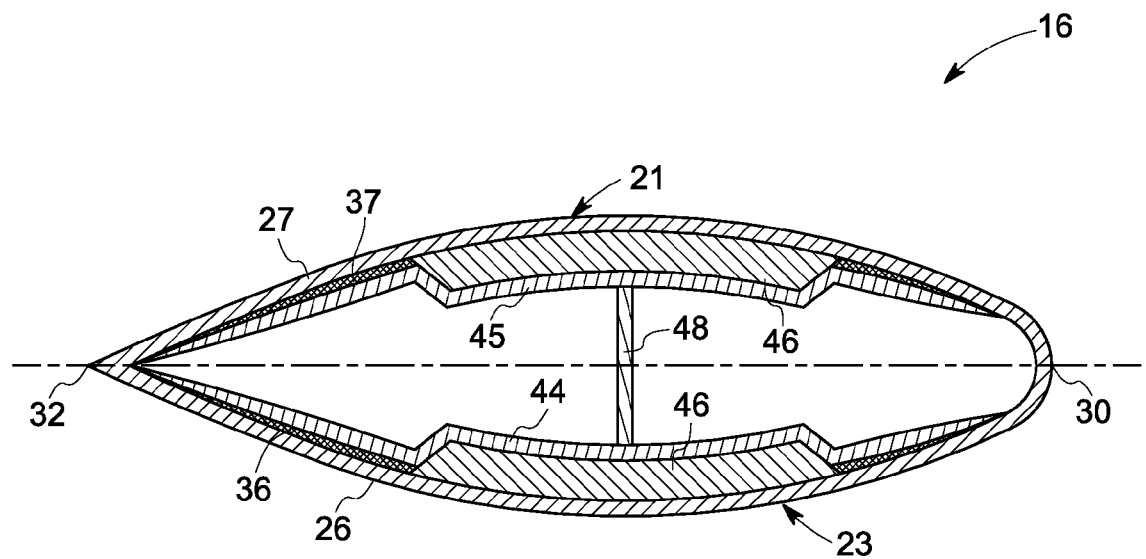
FIG. 3 is a cross-sectional view of the inboard blade segment along line 3-3 of FIG. 2.

FIG. 3 is a cross-sectional view of base region 22 of inboard blade segment 16 along line 3-3 of FIG. 2. Base region 22 includes longitudinal bending load bearing structures or base spar caps 46 between inboard outer skin 26, 27 and inner skin 44, 45. In one embodiment, base spar caps 46 are formed from continuous fiber reinforced composites such as carbon composites. In certain other embodiments, the base spar caps 46 may be formed of glass or carbon. One or more shear webs 48, 38 to be used for withstanding aerodynamic shear loading on the wind turbine blade 12 are disposed within the airfoil section between the base spar caps 46. In one embodiment, shear webs 48 and 38 of base region 22 and joint region 24 are separately made and joined with each other to extend along a full length of the inboard blade segment 16. In an alternative embodiment, shear webs 48 and 38 are portions of one integral shear web.

Figure 4:
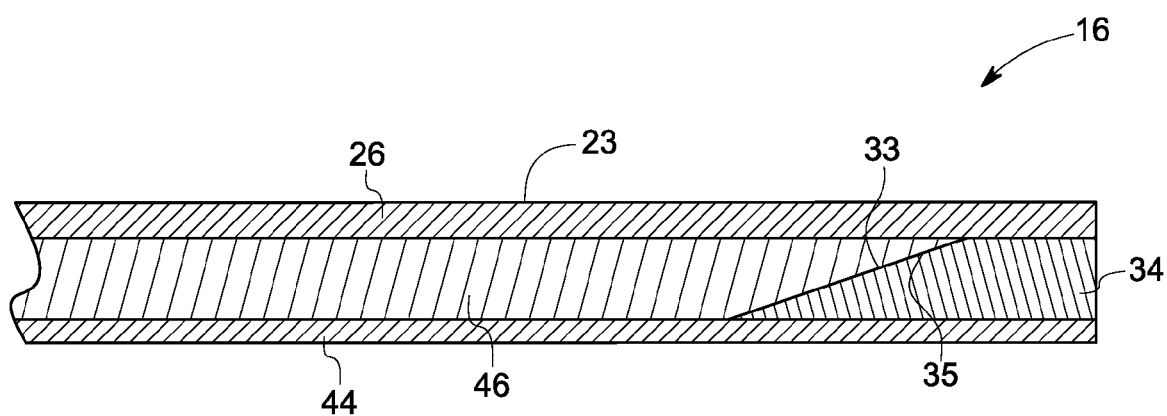
FIG. 4 is a partial cross-sectional view of the inboard blade segment along line 4-4 of FIG. 2.

FIG. 4 is an illustrative cross-sectional view of one embodiment of inboard blade segment 16 along line 4-4 of FIG. 2. In this embodiment, base spar caps 46 of base region 22 and upper and lower joint spar caps 34 of joint region 24 respectively have a first and a second tapered edge 33 and 35 engaging with each other. With this embodiment, a load on base spar caps 46 can be transferred to the joint spar caps 34 of the joint region 24. First and second tapered edges 33 and 35 in FIG. 4 are very exaggerated for purposes of illustration and are not drawn to scale.

With continued reference to FIG. 4, an exemplary process of fabricating a pressure side shell 23 of inboard blade segment 16 includes providing an outer skin 26 for example, laying up a plurality of biaxial glass layers.

A joint spar cap 34 is provided on an inner surface of outer skin 26 in joint region of pressure side shell 23. In one embodiment, joint spar cap 34 is formed by thickening outer skin 26 at joint region 24 with triaxial glass layers. In one embodiment, the triaxial glass layers are designed to have different length and width, so when they are laid up, a second tapered edge 35 is formed. In another embodiment, the outer shell is molded, and joint spar cap 34 is integrally molded together with the outer shell.

Base spar cap 46 is positioned on the inner surface of outer skin 26 in base region 22 of pressure side shell 23 adjacent to joint spar cap 34. As discussed above, in one embodiment, base spar cap 46 has a first tapered edge 33 to engage with second tapered edge 35 of joint spar cap 34. In one embodiment, the first and second tapered edges 33 and 35 are cured together after base spar cap 46 is properly positioned. A core 36 (FIGS. 2 and 3), comprising a material such as wood or foam, is laid on non-spar cap areas of outer skin 26.

In certain embodiments, the process of producing pressure side shell 23 of inboard blade segment 16 further includes laying an inner skin 44. For example, a joint of the first and second tapered edges 33 and 35 may be covered by inner skin 44. In certain embodiments, inner skin 44 includes biaxial glass layers.

Shear web 48 (FIG. 3) is positioned on inner skin 44 and adhered thereto. A suction side shell 21 of the inboard blade segment 16 is produced with one fabricating example being similar to the process of pressure side shell 23 described above. The suction side and pressure side shells 21, 23 are attached to each other in any structurally appropriate matter with one example being by adhesive.

In one embodiment, holes 40 and access slots 42 are machined in joint region 24 after suction side and pressure side shells 26, 27 are assembled together. In another embodiment, machining of holes 40 and access slots 42 can be performed immediately after joint spar cap 34 is produced. In still another embodiment, machining holes 40 and access slots 42 can be performed after the inner skin 44, 45 is laid on.

Figure 5:
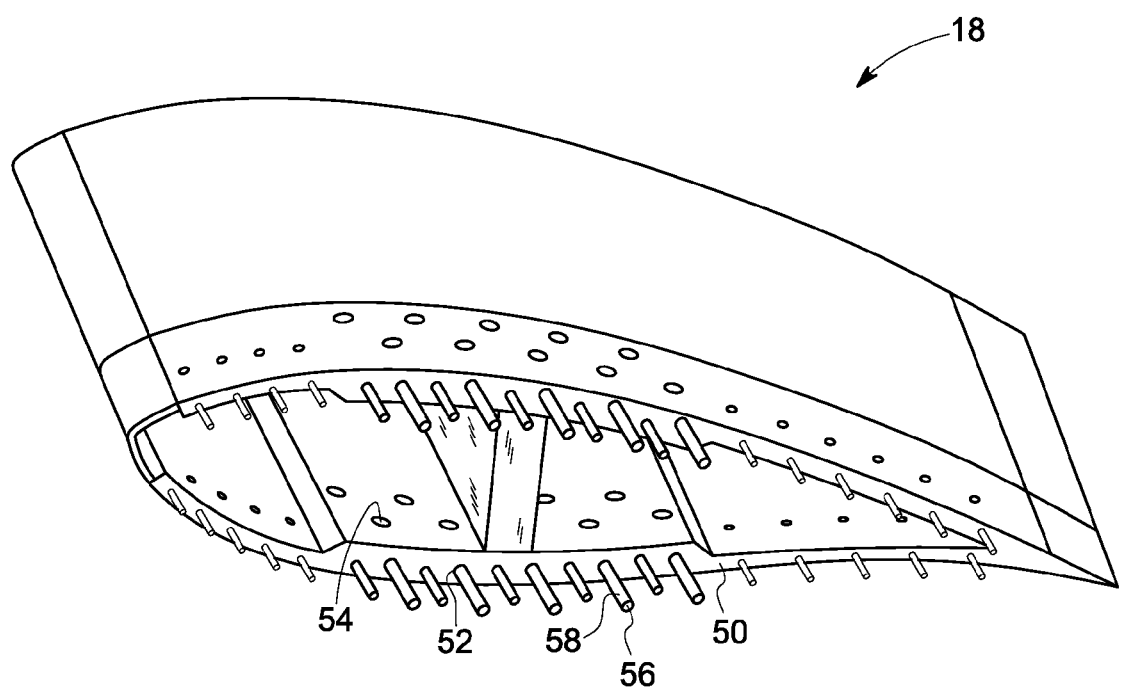
FIG. 5 is a perspective view of an outboard blade segment according to an embodiment of the invention.

FIG. 5 illustrates a perspective view of outboard blade segment 18 which may be fabricated in a similar process as inboard blade segment 16 described above and may have a similar structure as that of inboard blade segment 16. Outboard blade segment 18 has a mating face 50 adapted for engaging with inboard blade segment 16. A plurality of longitudinal holes 52 extend from mating face 50 into outboard blade segment 18, in the longitudinal direction. Holes 52 are respectively in alignment with holes 40 of inboard blade segment 16 when assembling the inboard and outboard blade segments 16 and 8 together. Outboard blade segment 18 defines a plurality of access slots 54 along a periphery direction, and each access slot 54 communicates with a corresponding hole 52. Inboard and outboard blade segments 16 and 18 can be manufactured in the same or different factories.

Figure 6:
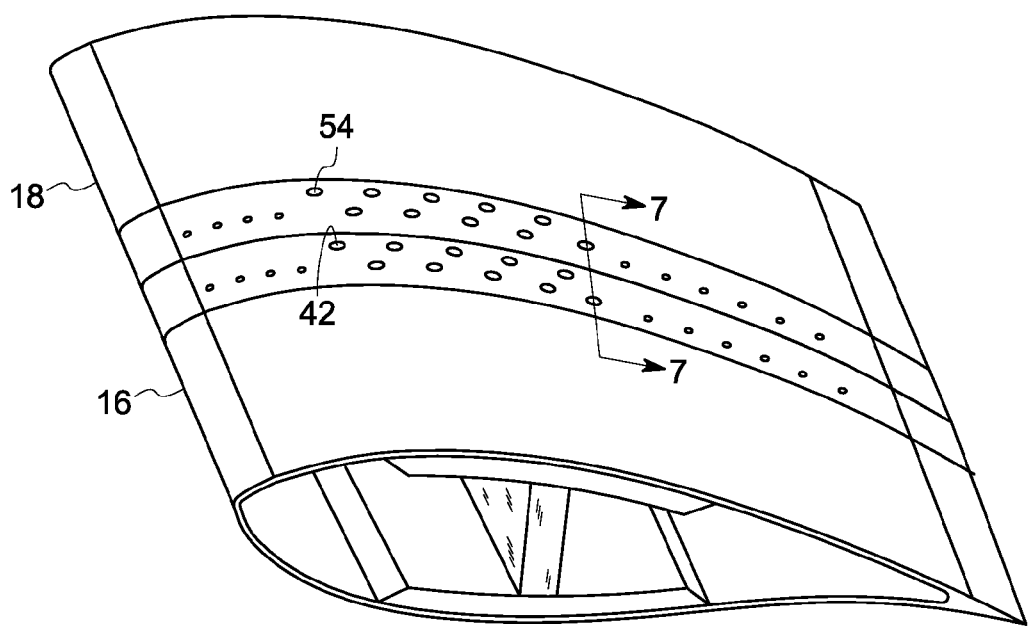
FIG. 6 illustrates the outboard and inboard blade segments engaging with each other.

After shipment, inboard and outboard blade segments 16 and 18 may be secured together as shown in FIG. 6. In one embodiment, the securing is accomplished with a T-bolt connection. In a more specific embodiment, a plurality of T-bolts 56 (shown in FIG. 5) may be pre-attached to one of the inboard and outboard blade segments 16 and 18. For example, T-bolts 56 may be pre-assembled to outboard blade segment 18 as shown in FIG. 5.

Figure 7:
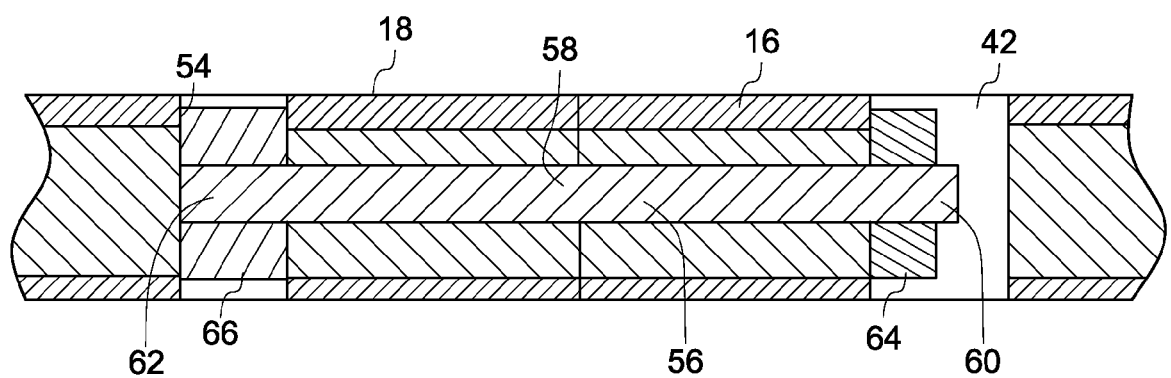
FIG. 7 is partial cross-sectional view of an assembly of the outboard and inboard blade segments along line 7-7 of FIG. 6 according to certain embodiments of the invention.

Referring to FIGS. 6 and 7, each T-bolt 56 includes a longitudinal stud 58 with opposite thread ends 60 and 62 (inboard and outboard thread ends) for engaging with barrel nuts 64 and 66. In the exemplary embodiment, outboard thread end 60 of each T-bolt 56 is secured in outboard blade segment 18 by a corresponding barrel nut 66 before being shipped, and, after shipping, inboard thread end 62 of each T-bolt 56 is extended into a corresponding access slot 42 of inboard blade segment 16 through a corresponding inboard longitudinal hole 40. In certain embodiments, barrel nuts 66 are glued to outboard blade segment 18 through adhesive. In a non-limiting example, the adhesive includes epoxy, an infusion resin, or combinations thereof.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A turbine blade comprising:
at least two blade segments, each blade segment comprising first and second shells joined together, a base region, at least one joint region including a mating face, each of the first and second shells further comprising:
an outer skin;
a base spar cap attached to an inner surface of the outer skin in the base region;
a joint spar cap attached to the inner surface of the outer skin in the joint region and adjacent to at least a portion of the base spar cap, wherein the joint spar cap includes holes in the mating face of the joint region; and
fasteners within the holes securing the at least two blade segments together.

2. The turbine blade of claim 1, wherein each of the first and second shells further includes a core attached to the inner surface of the outer skin in core regions of the shell, and an inner skin attached to the base and joint spar caps and the core.

3. The turbine blade of claim 1, wherein each blade segment further includes at least one shear web.

4. The turbine blade of claim 3, wherein the at least one shear web is adjacent to the base spar caps in the base region, and where the at least one shear web is adjacent to the joint spar caps in the joint region.

5. The turbine blade of claim 1, wherein each base spar cap comprises a first tapered edge, each joint spar cap comprises a second tapered edge, and the first and second tapered edges face each other.

6. The turbine blade of claim 1, wherein the holes extend from the mating face along a longitudinal direction of the turbine blade.

7. The turbine blade of claim 1, wherein the joint region defines a plurality of peripheral access slots with each access slot communicating with a corresponding hole.

8. The turbine blade of claim 7, wherein the joint region defines at least two rows of staggered access slots.

9. The turbine blade of claim 1, wherein the spar caps comprise carbon composites.

10. The turbine blade of claim 9, wherein the joint spar cap comprises triaxial glass.

11. A blade segment comprising:
first and second shells joined together, a base region, and at least one joint region including a mating face, each of the first and second shells further comprising:
an outer skin,
a base spar cap attached to an inner surface of the outer skin in the base region, and
a joint spar cap attached to the inner surface of the outer skin in the joint region and respectively adjacent to at least a portion of a corresponding base spar cap,
wherein the joint spar cap includes holes in the mating face of the joint region for insertion of fasteners; and
wherein each of the first and second shells further comprises a core attached to the inner surface of the outer skin, and an inner skin attached to the base and joint spar caps and the core.

12. The blade segment of claim 11, wherein each base spar cap comprises a first tapered edge, each joint spar cap comprises a second tapered edge, and the first and second tapered edges face each other.

13. The blade segment of claim 11, wherein the joint region defines a plurality of peripheral access slots with each access slot communicating with a corresponding hole.

14. A blade segment comprising:
first and second shells joined together, a base region, and at least one joint region including a mating face, each of the first and second shells further comprising:
an outer skin,
a base spar cap attached to an inner surface of the outer skin in the base region, and
a joint spar cap attached to the inner surface of the outer skin in the joint region and respectively adjacent to at least a portion of a corresponding base spar cap,
wherein the joint spar cap includes holes in the mating face of the joint region for insertion of fasteners; and
wherein the base spar caps comprise carbon composites, and the joint spar caps comprise triaxial glass.

15. A method of fabricating a blade segment comprising first and second shells, comprising:
providing first and second outer skins of the first and second shells;
providing joint spar caps respectively on inner surfaces of the first and second outer skins in joint regions of the first and second outer skins;
positioning base spar caps respectively on each inner surface of the first and second outer skins in base regions of the first and second outer skins and adjacent to the joint spar caps;
positioning at least one shear web between the pair of base spar caps and between the pair of joint spar caps;
attaching the first and second shells; and
providing holes in the joint spar caps in mating faces of the joint regions for insertion of fasteners.

16. The method of claim 15 wherein providing joint spar caps comprises providing joint spar caps each having a tapered edge, wherein the base spar caps have tapered edges, and wherein the base spar caps are positioned such that the tapered edges of the joint spar caps and the spar caps are engaged.

17. The method of claim 16 further comprising, prior to attaching the first and second shells, attaching inner skins respectively to the base spar caps and the joint spar caps at least in the area of the tapered edges.

18. The method of claim 16 wherein providing the joint spar caps comprises thickening the outer skin with triaxial glass layers in the joint region.

19. The method of claim 18, wherein the triaxial glass layers have different lengths and widths.

* * * * *

UNITED STATES PATENT AND TRADEMARK OFFICE
CERTIFICATE OF CORRECTION

| | | |
|---|---|---|
| PATENT NO. | : 7,891,947 B2 | |
| APPLICATION NO. | : 12/333522 | |
| DATED | : February 22, 2011 | |
| INVENTOR(S) | : Chen et al. | |

It is certified that error appears in the above-identified patent and that said Letters Patent is hereby corrected as shown below:

In Column 4, Line 20, delete "8" and insert -- 18 --, therefor.

Signed and Sealed this
Twenty-eighth Day of June, 2011

David J. Kappos
*Director of the United States Patent and Trademark Office*